(12) United States Patent
Lee

(10) Patent No.: US 8,472,914 B2
(45) Date of Patent: Jun. 25, 2013

(54) METHOD FOR CONTROLLING AUTOMATIC CHANNEL SETUP, AND IMAGE DISPLAY APPARATUS INCORPORATING THE SAME

(75) Inventor: Yu-jin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 928 days.

(21) Appl. No.: 11/705,441

(22) Filed: Feb. 13, 2007

(65) Prior Publication Data

US 2008/0055489 A1 Mar. 6, 2008

(30) Foreign Application Priority Data

Sep. 6, 2006 (KR) .................... 10-2006-0085724

(51) Int. Cl.
*H04B 13/02* (2006.01)
(52) U.S. Cl.
USPC .............................. 455/403; 348/734; 725/80
(58) Field of Classification Search
USPC ................ 455/403, 450, 218–220; 348/734, 348/732, 131, E5.097; 725/80, 137
See application file for complete search history.

(56) References Cited

U.S. PATENT DOCUMENTS

| 7,505,791 | B2* | 3/2009 | Yamamoto | 455/562.1 |
| 7,624,414 | B2* | 11/2009 | Onomatsu et al. | 725/72 |
| 7,668,520 | B2* | 2/2010 | Goto | 455/185.1 |
| 2003/0030755 | A1* | 2/2003 | Ahn | 348/732 |
| 2004/0105031 | A1* | 6/2004 | Shibusawa | 348/570 |
| 2004/0158855 | A1* | 8/2004 | Gu et al. | 725/39 |
| 2005/0066374 | A1* | 3/2005 | Nagamura et al. | 725/131 |
| 2006/0003690 | A1* | 1/2006 | Onomatsu et al. | 455/3.02 |
| 2006/0028588 | A1* | 2/2006 | Yi et al. | 348/732 |
| 2007/0060152 | A1* | 3/2007 | Sakamoto | 455/450 |
| 2007/0113252 | A1* | 5/2007 | Tokimoto et al. | 725/81 |
| 2009/0180037 | A1* | 7/2009 | Onomatsu et al. | 348/732 |

FOREIGN PATENT DOCUMENTS

| EP | 1622368 A1 | 2/2006 |
| EP | 1628483 A1 | 2/2006 |
| JP | 2004-343725 A | 12/2004 |

\* cited by examiner

*Primary Examiner* — Kamran Afshar
*Assistant Examiner* — Khawar Iqbal
(74) *Attorney, Agent, or Firm* — Sughrue Mion, PLLC

(57) ABSTRACT

A method and apparatus for controlling an automatic channel setup of an image display apparatus communicatable with an image receiving apparatus is provided. The apparatus includes a controller which determines the status of a connection with the image receiving apparatus during an automatic channel setup; and stops the automatic channel setup, if it is determined that the connection is a bad connection with the image receiving apparatus. The automatic channel setup is stopped when wireless connection is severed, such that mismapping of the channel does not occur, and waste of time for automatic channel setup may be prevented.

15 Claims, 3 Drawing Sheets

METHOD FOR CONTROLLING AUTOMATIC CHANNEL SETUP, AND IMAGE DISPLAY APPARATUS INCORPORATING THE SAME

CROSS-REFERENCE TO RELATED APPLICATIONS

This application claims priority under 35 U.S.C. §119 from Korean Patent Application No. 10-2006-0085724, filed on Sep. 6, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to controlling automatic channel setup, and more particularly, to controlling automatic channel setup based on the status of a signal received in the automatic channel setup.

2. Description of the Related Art

Image display apparatuses may operate to display externally received image data. Such image display apparatuses include mobile phones, personal digital assistants (PDAs) or televisions (TVs).

For example, a TV wirelessly receives a video signal from an external component such as a settop box, and displays the received signal. More specifically, when the settop box wirelessly transmits a digital video signal, which is received a tuner using an antenna, the image display apparatus displays a video corresponding to the video signal wirelessly received from the settop box.

At this time, the TV carries out automatic channel setup to search all the channels of a designated antenna, shifts the channels according to the automatic channel setup, wirelessly receives video signal at a desired channel, and displays the corresponding image. More specifically, the TV transmits an automatic channel setup command to the settop box to search the entire range of channels of a tuner of an antenna designated by the settop box, and when a channel is selected by a user, the TV wirelessly receives video signal at the selected channel from the settop box.

However, there is a problem of disconnection between the TV and the settop box during the automatic channel setup. More specifically, the wireless connection between the TV and the settop box is severed during the automatic channel setup, if the TV or the settop box is moved away from the TV because the level of reception signal gets weak. However, in the related art, the TV continues the automatic channel setup even when it is disconnected from the settop box, so the TV continuously sends out the automatic channel setup command to the settop box.

Accordingly, although it appears that the automatic channel setup continues, the channel search is not carried out, and a mis-mapping of the channel occurs.

Time is also wasted, because the automatic channel setup is continued even when the wireless connection is severed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for controlling automatic channel setup of an image display apparatus to prevent mis-mapping of channel when a wireless connection with an image receiving apparatus is severed during the automatic channel setup, and an image display apparatus incorporating the method.

The present invention also provides a method for controlling automatic channel setup of an image display apparatus to prevent waste of time due to continued automatic channel setup when a wireless connection with an image receiving apparatus is severed during the automatic channel setup, and an image display apparatus incorporating the method.

According to aspect of the present invention, there is provided a method for controlling an automatic channel setup of an image display apparatus communicatable with an image receiving apparatus, comprising carrying out automatic channel setup; determining a status of a connection with the image receiving apparatus during the automatic channel setup; and stopping the automatic channel setup, if it is determined that there is a bad connection with the image receiving apparatus.

The stopping may comprise displaying a poor connection message or an automatic channel setup stop message after stopping the automatic channel setup.

The stopping may comprise outputting an alarm sound or a voice message to indicate the bad connection, after stopping the automatic channel setup.

The image receiving apparatus may comprise a settop box, and be wirelessly connected to the image display apparatus.

According to another aspect of the present invention, there is provided an image display apparatus which communicates with an image receiving apparatus, comprising an input unit which receives an automatic channel setup command; a transmitting and receiving unit which is connected to the image receiving apparatus and transmits the input automatic channel setup command to the image receiving apparatus; and a controller which performs an automatic channel setup in response to the input automatic channel setup command, and stops the automatic channel setup if it is determined that there is a bad connection with the image receiving apparatus by the transmitting and receiving unit.

An on-screen display (OSD) unit may further be provided, which generates a message indicative of bad connection and a message indicative of stopping of the automatic channel setup. The controller may stop the automatic channel setup and output one of an alarm sound or voice message to indicate the bad connection.

The image receiving apparatus may comprise a settop box, and be wirelessly connected to the image display apparatus.

The input unit may receive a signal from a remote controller.

The input unit may receive an automatic channel setup key select signal of the image display apparatus.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
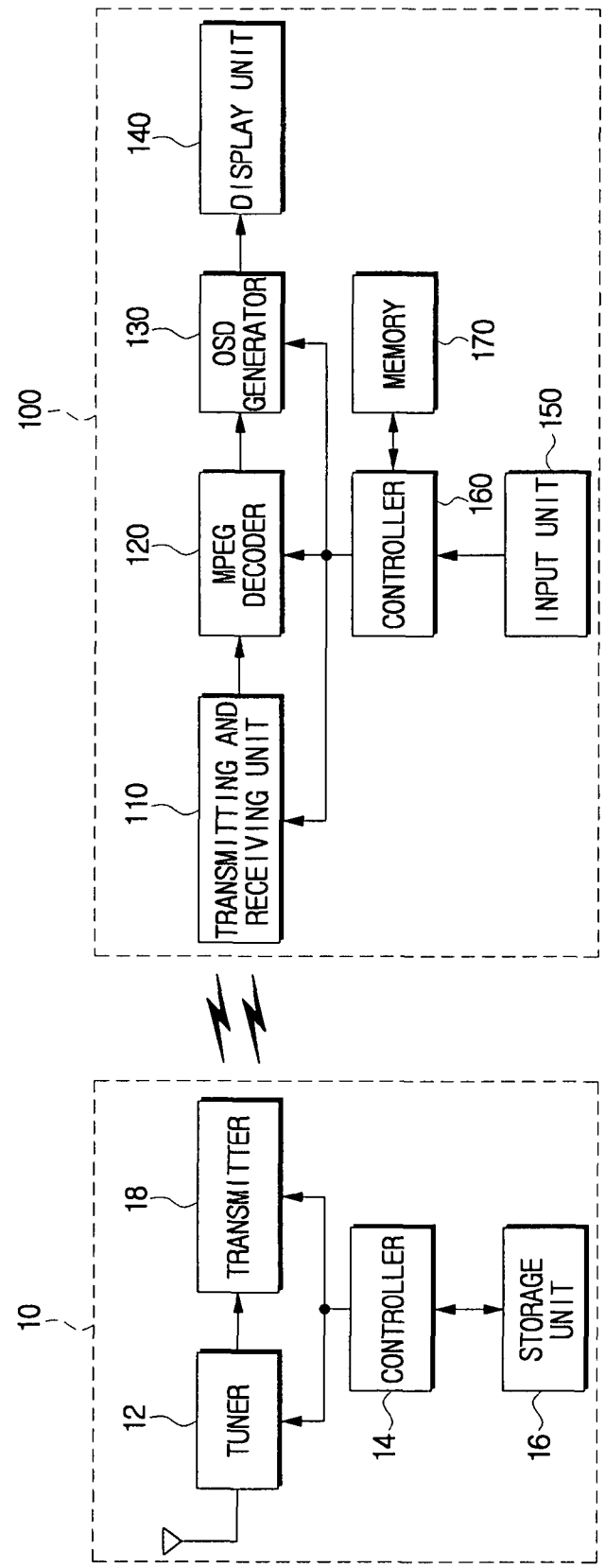
FIG. 1 is a block diagram of a wireless transmitting and receiving system, which includes an image display apparatus according to an exemplary embodiment of the present invention.

Certain exemplary embodiments of the present invention will now be described in detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a block diagram of a wireless transmitting and receiving system, which includes an image display apparatus according to an exemplary embodiment of the present invention.

A TV 100 will be explained below as one example of the image display apparatus of the present invention.

The TV 100 monitors a wireless connection with a settop box 10 which is implemented as an example of an image receiving apparatus.

If the wireless connection is severed or drops significantly during the automatic channel setup, the TV 100 stops the automatic channel setup and displays a message notifying of the disconnection.

Referring to FIG. 1, a wireless transmitting and receiving system includes the settop box 10 and the TV 100, which wirelessly transmit and receive data. More specifically, the settop box 10 channel-decodes a broadcast signal received over the antenna into a transport stream (TS), and wirelessly transmits the TS to the TV 100, such that the TV 100 transmits an automatic channel setup command to the settop box 10.

The settop box 10 receives a broadcast signal over the antenna, and transmits the received broadcast signal to the TV 100. The settop box 10 includes a tuner 12, a controller 14, a storage unit 16, and a transmitter 18.

More specifically, the tuner 12 receives the entire range of channels over the antenna during the automatic channel setup. The controller 14 controls the tuner 12 if an automatic channel setup command is received from the TV 100 via the transmitter 18, to receive the entire channels, and stores information about the channels received at the tuner 12 in the storage unit 16.

The storage unit 16 stores a channel map which contains information about all the channels received at the tuner 12. The transmitter 18, which is a wireless module, provides an interface for wireless communication with the TV 100, and transmits the TS received at the tuner 12 and an automatic channel setup confirm message to the TV 100 according to the control of the controller 14, and receives the automatic channel setup command from the TV 100.

The TV 100 displays an image corresponding to the video signal contained in the TS received from the settop box 10, and sets up a channel automatically. The TV 100 includes a transmitting and receiving unit 110, a Moving Picture Experts Group (MPEG) decoder 120, an On-screen display (OSD) generator 130, a display unit 140, an input unit 150, a controller 160 and a memory 170.

The transmitting and receiving unit 110 is a wireless module which provides a wireless interface for communication with the settop box 10, and receives the TS and the automatic channel setup confirm message from the settop box 10 (this will be described in detail below), and sends out an automatic channel setup command to the settop box 10 according to the control of the controller 160.

The MPEG decoder 120 de-compresses the video signal contained in the TS received at the transmitting and receiving unit 110. The OSD generator 130 generates an automatic channel setup menu, and generates a poor wireless connection message if a connection with the settop box 10 is bad. Additionally, the OSD generator 130 may generate an automatic channel setup stop message.

The display unit 140 displays an image corresponding to the de-compressed video signal by the MPEG decoder 120, and if the wireless connection with the settop box 10 is severed, displays a poor wireless connection message, or the automatic channel setup stop message, generated by the OSD generator 130.

The input unit 150 receives an automatic channel setup menu selection signal generated by the OSD generator 130, or if an automatic channel setup key is provided, receives a signal of the automatic channel setup key and transmits it to the controller 160. The input unit 150 may include a remote controller which outputs an operation signal according to a user command, and a remote controller signal receiving unit which receives a signal from the remote controller and transmits the signal to the controller 160.

If an automatic channel setup command signal is directly input through the input unit 150, the controller 160 caries out automatic channel setup, and controls the transmitting and receiving unit 110 to transmit the automatic channel setup command to the settop box 10.

The controller 160 monitors the wireless connection with the settop box 10 through the transmitting and receiving unit 110, and if an automatic channel setup confirm message is received from the settop box 10 at the transmitting and receiving unit 110, stores the searched channels in the channel map of the memory 170.

When it is determined that the wireless connection with the settop box 10 is bad during the monitoring operation, the controller 160 stops the automatic channel setup and controls the OSD generator 130 to generate and display a poor wireless connection message or an automatic channel setup stop message.

Figure 2A:
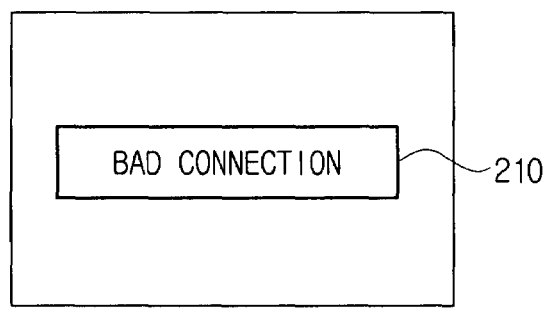
FIG. 2A illustrates a poor connection message generated according to an exemplary embodiment of the present invention.

FIG. 2A illustrates a poor connection message according to an exemplary embodiment of the present invention.

Referring to FIG. 2A, the OSD generator 130 generates a poor connection message 210 to indicate bad wireless connection with the settop box 10 according to the control of the controller 160, and displays the generated message 210 through the display unit 140.

Figure 2B:
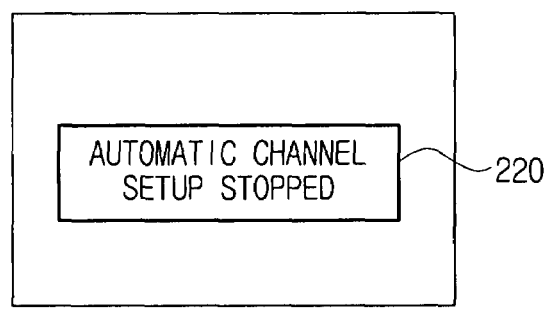
FIG. 2B illustrates a message to stop automatic channel setup according to an exemplary embodiment of the present invention.

FIG. 2B illustrates an automatic channel setup stop message according to an exemplary embodiment of the present invention.

Referring to FIG. 2B, the OSD generator 130 generates an automatic channel setup stop message 220 according to the control of the controller 160 to indicate that the automatic channel setup is being stopped due to a bad wireless connection with the settop box 10, and displays the generated message 220 through the display unit 140.

The OSD generator 130 may generate and display only one of the bad connection message 210 and the automatic channel setup stop message 220, or generate and display both the bad connection message 210 and the automatic channel setup stop message 220, or generate and display the bad connection message 210 and the automatic channel setup stop message 220 in turn.

Figure 3:
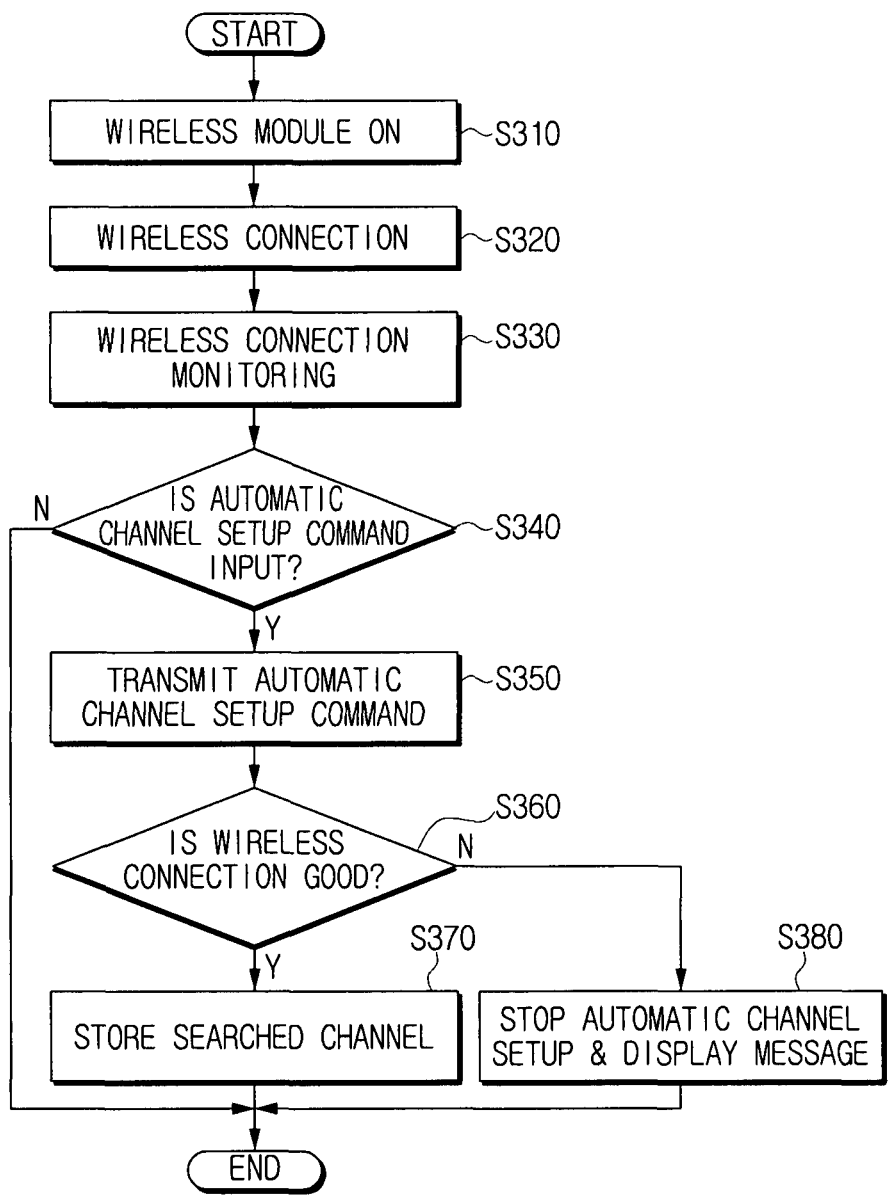
FIG. 3 is a flowchart of a method for controlling automatic channel setup of an image display apparatus according to an exemplary embodiment of the present invention.

FIG. 3 is a flowchart of a method for controlling an automatic channel setup of the image display apparatus according to an exemplary embodiment of the present invention.

Referring to FIG. 3, the controller 160, in response to power supply, supplies power to the wireless module, that is, to the transmitting and receiving unit 110 to turn on the wireless module (S310). The controller 160 then controls the transmitting and receiving unit 110 to wirelessly connect to the settop box 10 (S320). More specifically, the controller 160 transmits a wireless connection signal to the transmitting unit 18 of the settop box 10 through the transmitting and receiving unit 110, and if a wireless connection confirm signal is received from the transmitting unit 18 of the settop box 10 at the transmitting and receiving unit 110, the TV 100 and the settop box 10 are connected wirelessly.

The controller 160 monitors the wireless connection with the settop box 10 through the transmitting and receiving unit 110 (S330). At this time, the controller 160 sends out a wireless connection signal to the transmitting unit 18 of the settop box 10 through the transmitting and receiving unit 110, and monitors a wireless connection with the settop box 10 based on a wireless connection confirm signal which is received at the transmitting and receiving unit 110 from the transmitting unit 18 of the settop box 10.

The controller 160 then determines whether or not an automatic channel setup command is input (S340). The automatic channel setup command may be input through the automatic channel setup menu which is generated by the OSD generator 130, or input directly, through the automatic channel setup key provided at the input unit 150, that is, through the automatic channel setup key on the remote controller or the key on the TV 100.

If it is determined that the automatic channel setup command is input (S340—Y), the controller 160 controls the transmitting and receiving unit 110 to transmit the automatic channel setup command to the settop box 10 (S350). The automatic channel setup command instructs to check if the channel is in the channel map of the storage unit 16, that is, if the searched channel is received at the tuner 12 of the settop box 10.

The controller 14 of the settop box 10 carries out automatic channel setup if the controller receives the automatic channel setup command from the TV 100 at the transmitting unit 18. More specifically, the controller 14 determines whether the channel according to the automatic channel setup command is received at the tuner 12. If determined that the channel according to the automatic channel setup command is received at the tuner 12, the controller 14 controls the transmitting unit 18 to transmit the automatic channel setup confirm message to the TV 100. The controller 14 stores the information about the channel according to the automatic channel setup command, that is, stores the information about the channel received at the tuner 12 in the storage unit 16.

The controller 160 determines whether the wireless connection with the settop box 10 is good or bad (S360). The controller 160 keeps monitoring the wireless connection with the settop box 10 in operations S340 and S350, and thus, keeps determining whether a wireless connection confirm message is received from the settop box 10. The controller also may monitor whether an automatic channel setup confirm message is received from the settop box 10, or whether the wireless connection with the settop box 10 is good or bad according to the intensity of the signal received from the settop box 10.

The controller 160 may determine the wireless connection with the settop box 10 to be bad if the wireless connection confirm message is not received from the settop box 10. Additionally, the controller 160 may determine the wireless connection to be bad if automatic channel setup confirm message is not received, the intensity of the received signal does not satisfy the standard, or the noise of the received signal exceeds a threshold amount.

If it is determined that the wireless connection is good (S360-Y), the controller 160 stores the searched channels in the channel map of the memory 170 (S370). Accordingly, the controller 160 transmits the automatic channel setup command to the settop box 10 with respect to the searched channels among the channels of the channel map of the memory 170. If the automatic channel setup confirm message is received with respect to the respective searched channels from the settop box 10, the controller 160 stores the searched channels in the channel map of the memory 170 and ends the automatic channel setup.

If determined that the wireless connection is bad (S360—N), the controller 160 controls the OSD generator 130 to generate a poor wireless connection message and display the generated message through the display unit 140 (operation S380). The controller 160 may control such that an alarm, or voice instruction is generated to indicate a poor wireless connection.

While the settop box 10 and the TV 100 wirelessly connected to the settop box 10 were used as examples in explaining the method of controlling automatic channel setup according to the status of a received signal and an image display apparatus incorporating the method according to exemplary embodiments of the present invention, one will understand that these should not be construed as limiting, and thus, any adequate device that receives broadcast signal and device that displays the received signal, can be implemented.

As explained above, according to the exemplary embodiments of the present invention, an automatic channel setup may be stopped when a wireless connection is severed, such that a mis-mapping of the channel does not occur. The halting of the automatic channel setup may prevent wasting time performing the automatic channel setup during a severed connection.

Furthermore, by displaying a message to indicate that wireless connection is severed, a user's convenience may be increased.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for controlling automatic channel setup of an image display apparatus communicatable with an image receiving apparatus, the method comprising:

carrying out an automatic channel setup in which information about channels received by the image receiving apparatus is stored in a channel map;

determining a status of a connection between the image display apparatus and the image receiving apparatus during the automatic channel setup; and stopping the storing of information about channels received by the image receiving apparatus in the channel map in the automatic channel setup based on the status of the connection, wherein the automatic channel setup is stopped if it is determined that the status of the connection is a bad connection;

wherein the determining a status of the connection comprises determining that the connection is bad when an automatic channel setup confirm message has not been received by the image display apparatus in response to an automatic channel setup command transmitted from the image display apparatus to the image receiving apparatus, and determining that the connection is good when the automatic channel setup confirm message has been received by the image display apparatus in response to the automatic channel setup command and transmitted from the image display apparatus to the image receiving apparatus.

2. The method of claim 1, further comprising displaying a poor connection message or an automatic channel setup stop message after the stopping the automatic channel setup.

3. The method of claim 1, further comprising outputting an alarm sound or a voice message to indicate the bad connection, after the stopping the automatic channel setup.

4. The method of claim 1, wherein the image receiving apparatus comprises a settop box, and is wirelessly connected to the image display apparatus.

5. An image display apparatus which communicates with an image receiving apparatus, the image display apparatus comprising:

a transmitting and receiving unit which is communicably connected to the image receiving apparatus, and transmits an automatic channel setup command to the image receiving apparatus to perform an automatic channel setup in which information about channels received by the image receiving apparatus is stored in a channel map; and a controller which determines the status of a connection between the image display apparatus and the image receiving apparatus, and stops the storing of information about channels received by the image receiving apparatus in the automatic channel setup if the connection is determined to be a bad connection with the image receiving apparatus by the transmitting and receiving unit;

wherein the controller which determines the status of the connection determines that the connection is bad when an automatic channel setup confirm message has not been received by the image display apparatus in response to an automatic channel setup command transmitted from the image display apparatus to the image receiving apparatus, and determining that the connection is good when the automatic channel setup confirm message has been received by the image display apparatus in response to the automatic channel setup command transmitted from the image display apparatus to the image receiving apparatus.

6. The image display apparatus of claim 5, further comprising an input unit which receives an automatic channel setup command.

7. The image display apparatus of claim 6, wherein the input unit receives the automatic setup command via a signal from a remote controller.

8. The image display apparatus of claim 6, wherein the input unit receives an automatic channel setup key select signal of the image display apparatus.

9. The image display apparatus of claim 5, further comprising an on-screen display unit which generates a message indicative of the bad connection and a message which indicates the automatic channel setup has been stopped.

10. The image display apparatus of claim 5, wherein if the connection is determined to be bad, the controller stops the automatic channel setup and outputs one of an alarm sound or voice message to indicate the bad connection.

11. The image display apparatus of claim 5, wherein the image receiving apparatus comprises a settop box, and is wirelessly connected to the image display apparatus.

12. The image display apparatus of claim 5, wherein the connection is a wireless connection and the transmitting and receiving unit determines the status of the connection based on an intensity of a wireless signal received from the image receiving.

13. The image display apparatus of claim 5, wherein the connection is a wireless connection.

14. The image display apparatus of claim 13, where the transmitting and receiving unit receives a wireless connection confirmation from the image receiving apparatus if the wireless connection is established and determines the bad connection if an automatic channel setup confirmation message is not received from the image receiving apparatus.

15. The image display apparatus of claim 13, wherein the connection is determined to be the bad connection if noise of a signal received via the wireless connection exceeds a threshold value.

* * * * *